Oct. 2, 1934.                A. D. SINDEN                1,975,591
                             BELT CLEANER
                          Filed Nov. 15, 1932         2 Sheets-Sheet 2
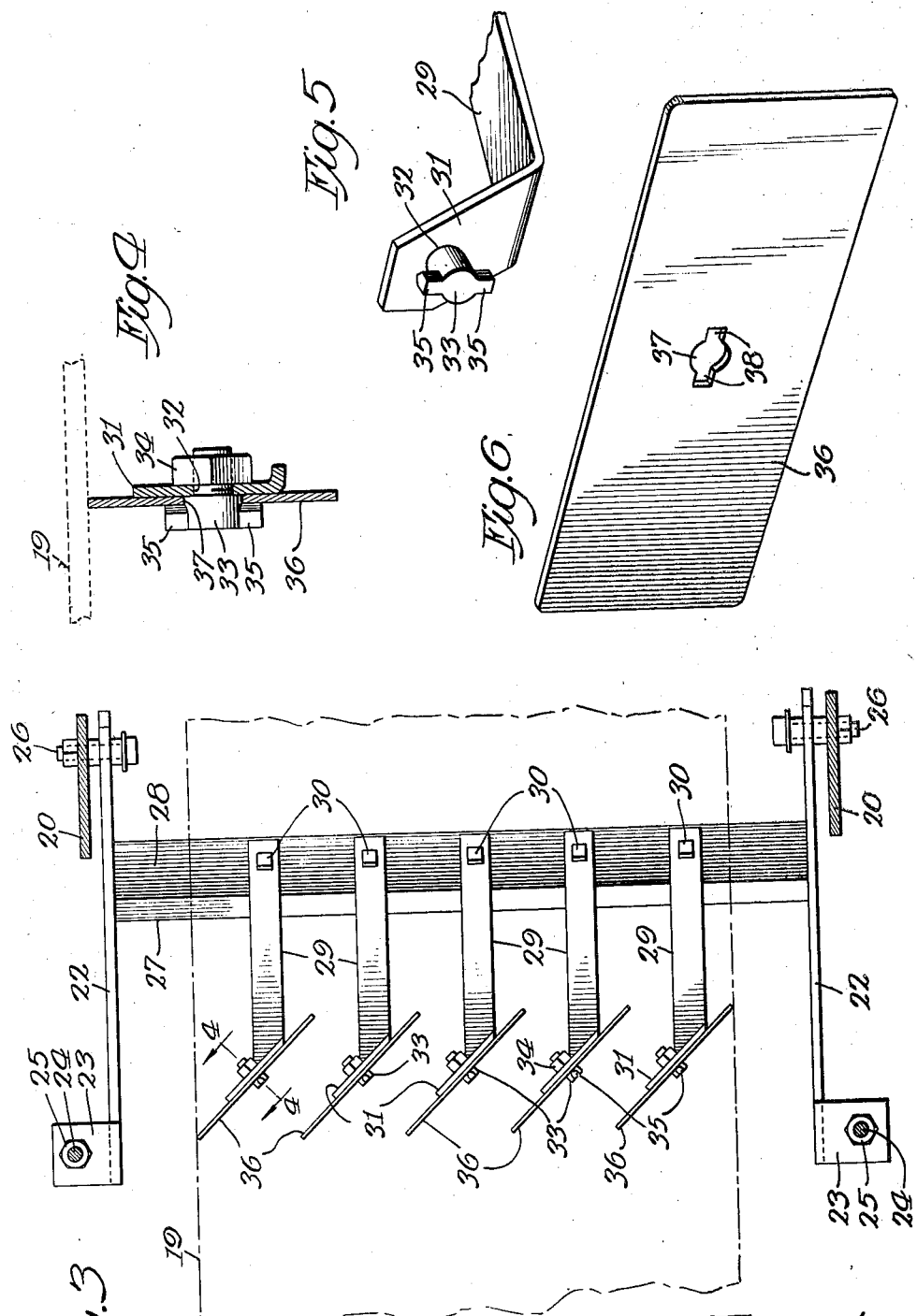
Inventor:
Alfred D. Sinden Patented Oct. 2, 1934

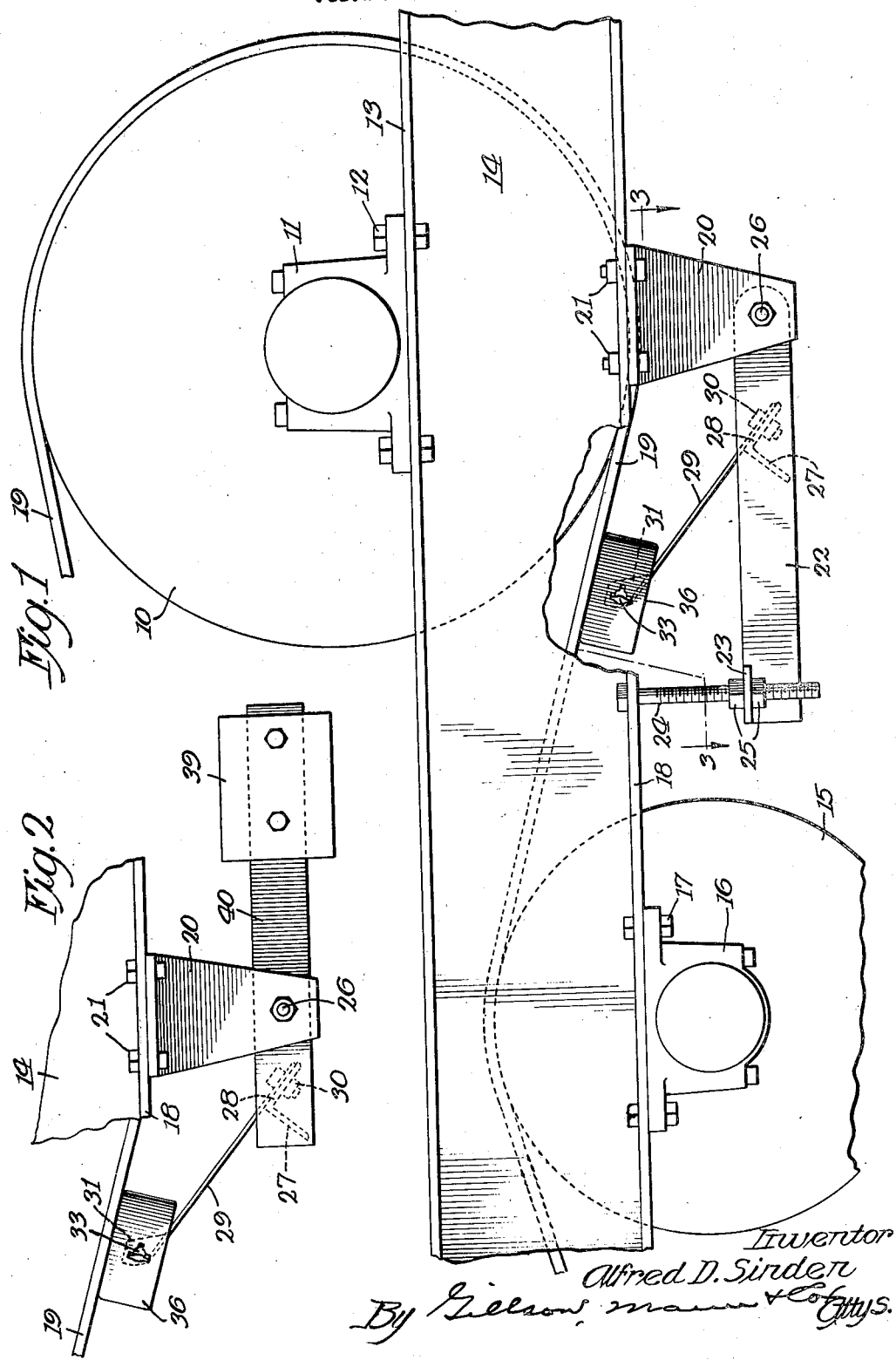

1,975,591

UNITED STATES PATENT OFFICE 1,975,591

BELT CLEANER

Alfred D. Sinden, Aurora, Ill., assignor to Stephens-Adamson Mfg. Co., a corporation of Illinois Application November 15, 1932, Serial No. 642,737

14 Claims. (Cl. 198—230)

In transporting certain kinds of material such as coal, coke, clay and ores, on belt conveyors, there is a tendency for particles to adhere to the belt after passing the discharge point, and sooner or later these particles cause trouble either by fouling the idlers that support the belt, by necessitating the removal of dribble from under the conveyor, or by becoming imbedded in the belt and reducing its quality.

It, therefore, becomes necessary to use a cleaning device of some kind beyond the discharge point, and stationary brushes, compressed air, scrapers and revolving brushes have been used for this purpose. None of these cleaning devices, however, have been thoroughly satisfactory, particularly in cases where the belt conveyor is handling coal.

It is, therefore, among the principal objects of this invention to provide a cleaning device that is particularly adapted for use with conveyors handling coal; that compensates for irregularities of the belt and the unevenness of its own wear; that reduces wear on the belt to a minimum; that is equipped with wearing surfaces which may be readily replaced; that removes all, or practically all material which adheres to the belt; and that is inexpensive to manufacture and install.

Further and other objects and advantages will become apparent as the disclosure proceeds and the description is read in conjunction with the accompanying drawings, in which Fig. 1 is a fragmentary, elevational view of the head end of a belt conveyor equipped with the cleaning device of this invention;

Fig. 2 is a fragmentary view showing a modification of the invention;

Fig. 3 is a sectional view taken on the line 3—3 of Fig. 1;

Fig. 4 is a sectional view showing the manner in which the wiper blade is detachably secured to the supporting arm;

Fig. 5 is a perspective view of a portion of the spring arm; and

Fig. 6 is a perspective view of the wiper blade.

It will be understood that the specific illustration and description of preferred forms of the invention are for the purpose of disclosure only and do not impose limitations upon the appended claims, except as may be required by the prior art.

Although only one side of a belt conveyor has been shown in the drawings, it will be understood that the head pulley 10 is journalled in bearings 11, secured by bolts 12 to the upper flanges 13 of the channel bars 14, and that the deflector pulley 15 is journalled in bearings 16 secured by bolts 17 to the bottom flanges 18 of the channel bars. The belt 19 is looped about the head pulley 10 and passes over the deflector pulley 15, as common in such constructions.

A bracket 20 is fastened by bolts 21 to the bottom flange 18 of each channel bar and pivotally supports a bar 22 having a flange 23 at its free end through which the bolt 24 is adapted to pass. Nuts 25 threaded on the bolt provide means for adjusting the position of the bar 22 about the pivot bolt 26.

Suitably secured between the bars 22 is a transverse angle bar 27 positioned so that one of its flanges 28 is at an angle of approximately 45° to the bars 22. The bar 27 carries a plurality of resilient bars 29, preferably of spring steel that has been hardened and tempered, the bars being secured to the flange 28 of the angle bar by bolts 30.

The free ends of the bars 29 are bent upwardly and laterally to provide flanges 31, making an angle of about 45° to the axis of the bar.

The flanges 31 are apertured at 32 to receive bolts 33 which are held in place on the flanges by nuts 34. The head of the bolt may be provided with integral wing lugs 35 or the head may be made cylindrical and then pierced with a suitable cotter pin to provide laterally extending lugs.

The wiper blade indicated at 36 is rectangular in shape and made of hard steel. It is provided with a central aperture 37 having wing recesses 38 corresponding in dimension to the laterally extending lugs 35 of the bolts 33. The wiper blade may, therefore, be secured to the arms 29 by slipping the blade over the bolt 33 and then turning it through an angle of 90°. The thickness of the blade being substantially the same as the distance between the lugs 35 and the flange 31 causes the blade to be firmly though not rigidly held in cross-wise position.

By referring to Fig. 3, it will be seen that the spring arms 29 are spaced apart at distances that will cause the blades to overlap one another in operating on the belt, which is shown in Fig. 3 in dotted lines. In other words, as the belt leaves the head pulley 10 on the start of its return run, the underside of the belt is scraped with blades that are yieldingly urged against the belt. The overlapping of the blades insures that the entire width of the belt will be effectively cleaned, and their loose connection with the bars 29 permits them to adjust themselves to the contour of the belt.

One of the advantages of the cleaning device that has just been described is that it accommodates itself to the irregularities of the belt and to its sag. Since several blades are used for cleaning the belt, each being mounted on a separate resilient arm, the entire width of the belt will be subjected to a scraping action. It is obvious that this is far more advantageous than where a single scraper is used because in such a case, part of the scraper may be bearing heavily against the belt while some other part does not even touch it.

Another feature of the invention is that the blades are quickly detachable from the arms 29 for replacement when they become worn out. Before it becomes necessary for them to be replaced, however, they may be inverted to permit the other long edge of the blade to be used as a working surface.

Obviously when the wear of the blades has progressed to such an extent that the arms 29 no longer force them against the belt, a readjustment of the bars 22 renews the effectiveness of the device.

In place of the threaded adjustment of the bar 22, as shown in Fig. 1, it is possible to employ the counterweight 39, as shown in Fig. 2 in which case the bar 40 corresponding to the bar 22 in Fig. 1 is extended beyond the bracket 20 to support the counterweight.

Although some of the advantages of this invention would be lost, it is apparent that other advantages would be maintained if the bars 29 were made rigid and yieldable means were employed elsewhere, such for example on the bolt 24 in Fig. 1. The counterweight 39 in Fig. 2 is in itself a yieldable means, in case the bars 29 were made rigid.

The bars 29 being all alike are interchangeable one for another as are also the blades 36, thereby resulting in economy of manufacture.

Although the specific dimensions of the parts will vary according to conditions of use, the following dimensions of the wiper blade 36 and spring arm 29 are given merely by way of illustration:

The arm 29 may have an overall length of nine inches, a width of one inch and a thickness of .0756 of an inch. The wiper blade may be six inches long, two inches wide and have a thickness of .0259 inch.

What I claim is:

1. In combination with a belt conveyor, a belt cleaner for removing material adhering to the belt after the load has been discharged, said cleaner comprising a resilient arm and a blade mounted on the arm engageable with the surface of the belt and tiltable around an axis substantially perpendicular to the flat blade surface.

2. In combination with a belt conveyor, a belt cleaner for removing material adhering to the belt after the load has been discharged, said cleaner including a scraping blade having at least two scraping edges, and means for pivotally mounting the scraping blade so that either of the edges may be yieldingly pressed against the belt, to follow lateral tilting thereof.

3. For use with a belt conveyor, a scraper comprising a resilient flat bar, and a blade pivotally secured to one end of the bar whereby it follows lateral tilting as well as vertical movement of the belt at the point where the scraper is installed.

4. For use with a belt conveyor, a scraper comprising a resilient flat bar, and a blade pivotally secured to one end of the bar adapted to follow lateral tilting of the belt, said blade being made of relatively thin hard metal.

5. In combination with a belt conveyor, a belt cleaner for removing material adhering to the belt after the load has been discharged, said cleaner comprising a plurality of scrapers, each scraper being short relative to the belt width and being made of relatively thin hard metal, and resilient arms individually supporting the scrapers in yielding engagement with the belt, said scrapers being pivotally mounted on the arms.

6. In an apparatus of the class described, a cleaner for removing material adhering to a conveyor belt after the load has been discharged, comprising a plurality of blades narrower than the belt for scraping the surface of the belt, and means carrying the blades upon pivots and pressing them yieldably against the belt, whereby the blades follow lateral tilting of the portions of the belt against which they bear.

7. In a conveying system, a conveyor belt running on pulleys, a blade adapted to scrape adhering material from the belt, bearing against the belt at a point between two of the pulleys, and means carrying the blade upon a pivot and pressing it yieldably against the belt, whereby it follows lateral tilting of the portion of the belt against which it bears.

8. In a conveying system, a conveyor belt running over pulleys, a plurality of thin inflexible scrapers bearing against the belt between two pulleys, each scraper being substantially narrower than the belt, and separate means for holding each scraper tiltably and yieldably against the belt, whereby each scraper is maintained pressed against the moving belt at all points along its edge.

9. In a conveying system, a conveyor belt running over pulleys, a plurality of scrapers narrow relatively to the belt, bearing against the belt at a point between two of the pulleys, and tiltable to follow the movements of the belt, and separate means for holding each scraper yieldably against the belt through a pivot mounting.

10. In an apparatus of the class described, a cleaner for removing adhering material from a conveyor belt, comprising a plurality of rigid, thin scrapers, narrow relatively to the belt, and separate means for holding each scraper tiltably and yieldably against the belt, whereby each scraper is held in contact with the moving belt for the full length of its scraping edge, whatever may be the changes in contour of the moving belt.

11. In an apparatus of the class described, a cleaner for removing from a conveyor belt material that adheres after the load is discharged, comprising a plurality of scrapers that are narrower than the belt and separate means for holding each scraper yieldably and tiltably against the belt, whereby the scrapers are all held in full contact with the belt, whatever may be the movements of any one of them in following movements of the belt.

12. In a system for conveying materials on a conveyor belt, a cleaner for removing adhering material from the belt after the discharge of the load therefrom, comprising a blade of relatively thin hard metal for scraping the surface of the belt, and means carrying the blade on a pivot and pressing it tiltably and yieldably against the belt, whereby the blade follows lateral tilting of the portion of the belt against which it bears.

13. In a conveying system, a conveyor belt running over pulleys, a plurality of rigid thin blades narrower than the belt for scraping adhering material from the belt, bearing against the belt at a point between two pulleys, and means carrying the blades on pivots and pressing them yieldably and tiltably against the belt, whereby each blade follows the vertical movements and tilting of the portion of the moving belt against which it bears.

14. In a system for conveying materials, a conveyor belt running on pulleys, a plurality of thin scrapers of hard material narrow relatively to the belt and bearing against the belt at a point between two pulleys, and separate means for holding each scraper yieldably against the belt, independently of movements of the other scrapers.

ALFRED D. SINDEN.